(12) United States Patent
Yang

(10) Patent No.: US 10,249,013 B2
(45) Date of Patent: Apr. 2, 2019

(54) METHOD AND SYSTEM FOR WIRELESS PAYMENT OF PUBLIC TRANSPORT FARE

(71) Applicant: Alibaba Group Holding Limited, George Town, Grand Cayman (KY)

(72) Inventor: Wenxue Yang, Hangzhou (CN)

(73) Assignee: Alibaba Group Holding Limited, George Town (KY)

( * ) Notice: Subject to any disclaimer, the term of this patent is extended or adjusted under 35 U.S.C. 154(b) by 542 days.

(21) Appl. No.: 15/005,458

(22) Filed: Jan. 25, 2016

(65) Prior Publication Data

US 2016/0224974 A1 Aug. 4, 2016

(30) Foreign Application Priority Data

Feb. 3, 2015 (CN) .......................... 2015 1 0056149

(51) Int. Cl.
*G06Q 50/30* (2012.01)
*G06Q 20/08* (2012.01)
*G06Q 20/32* (2012.01)
*G07B 15/02* (2011.01)

(52) U.S. Cl.
CPC .......... *G06Q 50/30* (2013.01); *G06Q 20/085* (2013.01); *G06Q 20/325* (2013.01); *G06Q 20/327* (2013.01); *G06Q 20/3224* (2013.01); *G07B 15/02* (2013.01)

(58) Field of Classification Search
CPC ...... G07B 15/063; G07B 15/02; G06Q 50/30; G06Q 20/327; G06Q 20/3224; G06Q 20/325; G06Q 20/085
See application file for complete search history.

(56) References Cited

U.S. PATENT DOCUMENTS

| 4,281,391 A | 7/1981 | Huang |
| 6,526,166 B1 | 2/2003 | Gorman |
| 6,697,947 B1 | 2/2004 | Matyas, Jr. |

(Continued)

FOREIGN PATENT DOCUMENTS

| CN | 201498035 | | 6/2010 |
| CN | 201498035 U | * | 6/2010 |

(Continued)

OTHER PUBLICATIONS

Finzgar, Use of NFC and QR code identification in an electronic ticket system for public transport, Sep. 15-17, 2011, IEEE, Nov. 1, 2011 (Year: 2011).*

*Primary Examiner* — Kevin H Flynn
*Assistant Examiner* — Ismail A Manejwala
(74) *Attorney, Agent, or Firm* — Shun Yao; Park, Vaughan, Fleming & Dowler LLP

(57) ABSTRACT

Embodiments of the present application provide a method and system for wireless payment of transport fare. During operation, the system receives a request at a server from a mobile device for information of a payee's account, which is associated with a public transport and corresponds to a wireless network identifier of a wireless network located on the public transport. The server may determine information of the payee's account corresponding to the wireless network identifier. The server then sends the payee's account information to the mobile device. The system may then receive, from the mobile device, a payment order to make a payment to the payee's account.

19 Claims, 14 Drawing Sheets

(56) References Cited

U.S. PATENT DOCUMENTS

| | | |
|---|---|---|
| 6,726,094 B1 | 4/2004 | Rantze |
| 7,149,720 B2 | 12/2006 | Shepherd |
| 7,321,874 B2 | 1/2008 | Dilip |
| 7,734,527 B2 | 6/2010 | Uzo |
| 7,809,636 B1 | 10/2010 | Jou |
| 7,809,762 B1 | 10/2010 | Parker |
| 7,941,760 B2 | 5/2011 | Kocienda |
| 7,946,474 B1 | 5/2011 | Agrawal |
| 7,978,900 B2 | 7/2011 | Nepomniachtchi |
| 8,090,642 B1 | 1/2012 | Van Doren |
| 8,176,324 B1 | 5/2012 | Krishnamurthy |
| 8,280,782 B1 | 10/2012 | Talreja |
| 8,423,392 B2 | 4/2013 | Moxley |
| 8,423,467 B1 | 4/2013 | Johansson |
| 8,645,295 B1 | 2/2014 | Dillard |
| 9,111,073 B1 | 8/2015 | Jiang |
| 9,239,722 B1 | 1/2016 | Calahan |
| 9,621,348 B2 | 4/2017 | Bahjat |
| 2002/0111916 A1 | 8/2002 | Coronna |
| 2002/0161466 A1 | 10/2002 | Heching |
| 2003/0042301 A1 | 3/2003 | Rajasekaran |
| 2003/0061172 A1 | 3/2003 | Robinson |
| 2003/0200190 A1 | 10/2003 | Adar |
| 2004/0139008 A1 | 7/2004 | Mascavage |
| 2004/0153407 A1 | 8/2004 | Clubb |
| 2005/0038707 A1 | 2/2005 | Roever |
| 2005/0071637 A1 | 3/2005 | Shirakawa |
| 2005/0075954 A1 | 4/2005 | Matsumoto |
| 2005/0113123 A1 | 5/2005 | Torvinen |
| 2005/0144406 A1 | 6/2005 | Chong, Jr. |
| 2005/0170856 A1 | 8/2005 | Keyani |
| 2005/0240935 A1 | 10/2005 | Ramanathan |
| 2006/0010190 A1 | 1/2006 | Shimbo |
| 2006/0056626 A1 | 3/2006 | Keohane |
| 2006/0069635 A1 | 3/2006 | Ram |
| 2006/0089897 A1 | 4/2006 | Maas |
| 2006/0176847 A1 | 8/2006 | Chen |
| 2006/0220842 A1 | 10/2006 | Breed |
| 2006/0271783 A1 | 11/2006 | Wong |
| 2007/0035617 A1 | 2/2007 | Ko |
| 2007/0043651 A1 | 2/2007 | Xiao |
| 2007/0276730 A1 | 11/2007 | Lee |
| 2008/0004981 A1 | 1/2008 | Gopalpur |
| 2008/0077542 A1 | 3/2008 | McElhiney |
| 2008/0097805 A1 | 4/2008 | Wells |
| 2008/0119160 A1 | 5/2008 | Andriantsiferana |
| 2008/0120160 A1 | 5/2008 | Woo |
| 2008/0182586 A1 | 7/2008 | Aaron |
| 2008/0228595 A1 | 9/2008 | Hill |
| 2008/0306839 A1 | 12/2008 | Starrs |
| 2009/0076926 A1 | 3/2009 | Zinberg |
| 2009/0090772 A1* | 4/2009 | Lee ............... G07B 15/02 235/382 |
| 2009/0106825 A1 | 4/2009 | Cerruti |
| 2009/0144451 A1 | 6/2009 | Cabezas |
| 2009/0157522 A1 | 6/2009 | Srinivasan |
| 2009/0195506 A1 | 8/2009 | Geidl |
| 2010/0060585 A1 | 3/2010 | Chiu |
| 2010/0073302 A1 | 3/2010 | Ritzau |
| 2010/0088026 A1 | 4/2010 | Manolescu |
| 2010/0162036 A1 | 6/2010 | Linden |
| 2010/0191648 A1* | 7/2010 | Smith ............... G06Q 20/108 705/42 |
| 2010/0210240 A1 | 8/2010 | Mahaffey |
| 2010/0223543 A1 | 9/2010 | Marston |
| 2010/0235283 A1 | 9/2010 | Gerson |
| 2010/0241575 A1 | 9/2010 | Cotton |
| 2010/0250436 A1 | 9/2010 | Loevenguth |
| 2011/0016520 A1 | 1/2011 | Cohen |
| 2011/0093493 A1 | 4/2011 | Nair |
| 2011/0125616 A1 | 5/2011 | Ni |
| 2011/0184840 A1 | 7/2011 | Godard |
| 2011/0231465 A1 | 9/2011 | Phatak |
| 2011/0258027 A1 | 10/2011 | Lee |
| 2011/0264598 A1 | 10/2011 | Fuxman |
| 2012/0016799 A1 | 1/2012 | Killian |
| 2012/0076283 A1 | 3/2012 | Ajmera |
| 2012/0101942 A1* | 4/2012 | Park ............... G06Q 20/0457 705/40 |
| 2012/0117271 A1 | 5/2012 | Kennedy |
| 2012/0143924 A1 | 6/2012 | Sethi |
| 2012/0158467 A1 | 6/2012 | Hammad |
| 2012/0204256 A1 | 8/2012 | Craine |
| 2012/0259774 A1 | 10/2012 | Marti |
| 2012/0259783 A1 | 10/2012 | Kemper |
| 2012/0299831 A1 | 11/2012 | Lioy |
| 2012/0323846 A1 | 12/2012 | Bai |
| 2013/0066889 A1 | 3/2013 | Rodriguez |
| 2013/0094751 A1 | 4/2013 | Nepomniachtchi |
| 2013/0110670 A1 | 5/2013 | Webber |
| 2013/0232071 A1 | 9/2013 | Dilip |
| 2013/0246172 A1 | 9/2013 | Moissinac |
| 2013/0297730 A1 | 11/2013 | Zeng et al. |
| 2013/0311532 A1 | 11/2013 | Olsen |
| 2013/0317895 A1 | 11/2013 | Turner |
| 2013/0331130 A1 | 12/2013 | Lee |
| 2014/0037184 A1 | 2/2014 | Gorski |
| 2014/0052636 A1 | 2/2014 | Mattes |
| 2014/0156512 A1 | 6/2014 | Rahman |
| 2014/0162698 A1 | 6/2014 | Han |
| 2014/0164109 A1 | 6/2014 | Chow |
| 2014/0236801 A1 | 8/2014 | Hansen |
| 2014/0279525 A1 | 9/2014 | Mohsenzadeh |
| 2014/0280910 A1 | 9/2014 | Swig |
| 2014/0306896 A1 | 10/2014 | Sosby |
| 2014/0310171 A1 | 10/2014 | Grossman |
| 2015/0066679 A1 | 3/2015 | Mack |
| 2015/0186989 A1 | 7/2015 | Kneen |
| 2015/0220876 A1 | 8/2015 | Sethi |
| 2015/0235477 A1* | 8/2015 | Simkin ............... G07B 15/02 705/417 |
| 2015/0356288 A1 | 12/2015 | Guo |
| 2015/0379460 A1 | 12/2015 | Zamer |
| 2016/0012503 A1 | 1/2016 | Fu |
| 2016/0077734 A1 | 3/2016 | Buxton |
| 2017/0270598 A1 | 9/2017 | Ram |

FOREIGN PATENT DOCUMENTS

| | | | |
|---|---|---|---|
| DE | 102004047258 | | 4/2006 |
| DE | 102004047258 A1 * | 4/2006 | ............... G07C 9/00 |
| EP | 0992949 | | 4/2000 |
| EP | 0992949 A2 * | 4/2000 | ............ G06M 1/108 |
| EP | 1067471 | | 1/2001 |
| JP | 10240690 | | 9/1998 |
| JP | 2000082101 | | 3/2000 |
| JP | 2001297283 | | 10/2001 |
| JP | 2003271851 | | 9/2003 |
| JP | 2006259854 | | 9/2006 |
| JP | 2008532112 | | 8/2008 |
| JP | 2014515149 | | 6/2014 |
| KR | 1020020057906 | | 7/2002 |
| WO | 2012045128 | | 4/2012 |
| WO | 2013003372 | | 1/2013 |
| WO | 2013149883 | | 10/2013 |
| WO | 2017080768 | | 5/2017 |

* cited by examiner

METHOD AND SYSTEM FOR WIRELESS PAYMENT OF PUBLIC TRANSPORT FARE

RELATED APPLICATION

Under 35 U.S.C. 119, this application claims the benefit and right of priority of Chinese Patent Application No. 201510056149.6, filed 3 Feb. 2015.

BACKGROUND

Field

The present invention relates to payment systems, and particularly relates to a method and system for wireless payment of public transport fare.

Related Art

The emergence of mobile payment methods enables users to make payments to payees wirelessly. In most cases, users are required to input the payee's account information during the payment process. However, users may make errors in inputting account and payment information, and it is inconvenient for users to repeatedly input such information.

With the wide use of self-service ticketing and contactless integrated circuit card (e.g., IC card) fare payment systems, swiping cards has become a mainstream method for payment of transport fares. Though this method is more convenient than buying a ticket or inserting coins, passengers must still queue up to make payments. On occasions where there are too many passengers, such as during rush hour, boarding efficiency is significantly reduced and the waiting time to board vehicles becomes longer. Thus, current payment processes are likely to cause crowding as well as traffic jams due to long queues of passengers and vehicles.

SUMMARY

One embodiment of the present invention provides a system for wireless payment. During operation, the system may receive a request at a server from a mobile device for information of a payee's account, which is associated with a public transport and corresponds to a wireless network identifier of a wireless network located on the public transport. The server may determine information of the payee's account corresponding to the wireless network identifier. The server then sends the payee's account information to the mobile device. The system may then receive, from the mobile device, a payment order to make a payment to the payee's account, thereby allowing a user to pay a fare for the public transport using the mobile device.

In a variation of this embodiment, the system may determine a number of passengers currently on board the public transport. The system may receive transport fare paid to the payee's account. The system may receive a start signal for calculating transport fares. The system may then calculate a sum of transport fares during a predetermined time period since receiving the start signal. The system may determine if the sum of transport fares is correct based on a number of passengers currently on board.

If the sum of transport fares is incorrect, the system may send a payment reminder to passengers and re-calculate the sum of transport fares. If the sum of transport fares is correct, the system may terminate review of transport fares.

In a variation of this embodiment, the system may receive one or more images of passengers from a camera installed on the public transport, and apply an optical flow field technique to the one or more images to determine a number of passengers on the public transport.

In a variation on this embodiment, the system may determine a number of passengers who have paid fare for the public transport. The system may determine if the number of passengers who have paid the transport fare is equal to a number of passengers currently on board the public transport. Responsive to determining that the number of passengers who have paid the transport fare is not equal to the number of passengers currently on board the public transport, the system may send a reminder to the passengers to make payment.

In a variation on this embodiment, the system may receive sensor data from a sensor installed near an entrance door of the public transport, and determine a number of passengers on the public transport based on the sensor data.

In a variation on this embodiment, the system may receive sensor data from two or more infrared sensors located near an entrance of the public transport, and determine a number of passengers on the public transport based on the sensor data.

In a variation on this embodiment, the system may establish a wireless network, in which a wireless network identifier of the wireless network corresponds to the payee's account. The system may receive a connection request from the mobile device to connect with the wireless network to obtain the wireless network identifier.

Another embodiment of the present invention provides a system for paying transport fare. During operation, the system may detect a wireless network located on a public transport. The system may then establish a connection with the wireless network. The system may then acquire a wireless network identifier from the wireless network. The system may send the wireless network identifier to a server over the wireless network. The system may receive, from the server, information regarding a payment account associated with the public transport. The system may then generate a payment order to make payment to the payment account.

Another embodiment of the present invention provides a system for paying transport fare. During operation, the system may receive transport fare paid to a vehicle's account. The system may then receive a start signal for calculating transport fares. The system may calculate the sum of transport fares during a predetermined time period since receiving the start signal for calculating transport signal.

BRIEF DESCRIPTION OF THE DRAWINGS

The accompanying drawings described herein are used for further understanding the present application and constitute a part of the present application, and the schematic embodiments of the present application and the descriptions thereof are used for interpreting the present application, rather than improperly limiting the present application. In which.

DETAILED DESCRIPTION OF EMBODIMENTS

Embodiments of the present invention solve the problem of inefficient fare payment by allowing a user's mobile device to connect to a wireless network to obtain fare payment information. The user's mobile device connects to a remote server to obtain account information and submit payment. By allowing the user to pay a bus fare over a wireless network, embodiments of the present invention remove inefficiencies associated with requiring the user to manually input account information and/or swiping a payment card.

Figure 1:
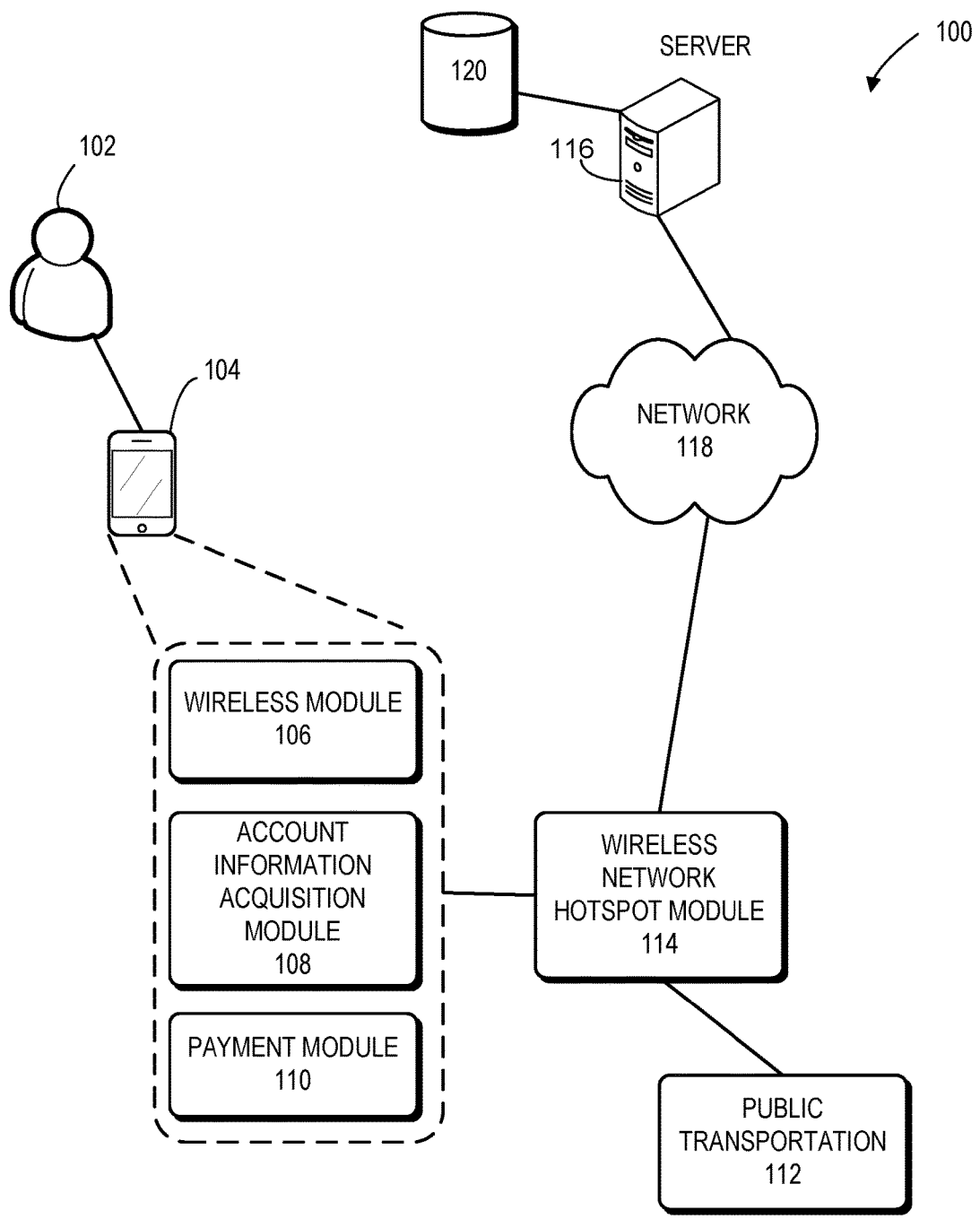
FIG. 1 presents a diagram illustrating an exemplary computing system for wireless payment of public transport fare, in accordance with an embodiment of the present invention.

FIG. 1 presents a diagram illustrating an exemplary computing system 100 for wireless payment of public transport fare, in accordance with an embodiment of the present invention. As illustrated in FIG. 1, a user 102 may be operating a mobile device 104 that includes installed modules for wireless payment of public transport fare. These modules may include a wireless module 106, an account information acquisition module 108, and a payment module 110. User 102 may be boarding a public transportation 112 (e.g., a public bus) that is equipped with a wireless network hotspot module 114. Wireless network hotspot module 114 may set up a wireless network hotspot that passengers' mobile devices can access to make fare payments. Wireless module 106 can access the wireless hotspot by connecting to wireless network hotspot module 114, and obtain a wireless network identifier. Once connected, account information acquisition module 108 may use the wireless network to communicate with a server 116 over a network 118.

Account information acquisition module 108 may send a request with the wireless network identifier to server 116, in order to request payment account information associated with the public transport. In some embodiments, server 116 may be a payment server that receives transport fare paid by passengers. Server 116 may also represent a cluster of servers. Server 116 may perform a lookup by searching a database 120 for account information corresponding to the wireless network identifier. Server 116 then sends the account information back to the mobile device. Payment module 110 may make a fare payment to the account, based on the account information provided by server 116.

In some embodiments, server 116 may also perform other functions, such as determining whether passengers have all correctly paid their transport fares based on the number of passengers in the vehicles. Server 116 may perform the operations described in this disclosure, such as operations described with respect to FIG. 3, FIG. 5, FIG. 6, and FIG. 7. Server 116 may also include one or more of the modules described with respect to FIG. 8 and FIG. 9. Server 116 may receive data from vehicles that allow server 116 to perform the operations depicted in the figures, and may send instructions to the vehicles to remind passengers to pay their fares. For example, server 116 may receive sensor data over network 118 from sensors installed on public transportation vehicles, and analyze the sensor data to determine the number of passengers on the vehicles to determine whether all passengers have paid their fares.

Public transportation 112 may also be equipped with additional modules and devices to confirm that the passengers have made appropriate payments to the payment account. For example, public transportation 112 may have cameras or pressure sensors installed to count the number of passengers, and determine whether all passengers have made correct payment. The modules and methods for confirming that passengers have made correct payments are discussed further below.

With this system, when passengers board public transportation, the passengers no longer need to manually input account information or pull out an IC card to make payment, thereby improving boarding efficiency for passengers. This alleviates traffic jams and increases the overall efficiency for the public transportation system. Passengers may no longer need to queue to board public transportation, and the transportation system also receives the correct fares from the passengers.

Exemplary Wireless Payment and Account Information Acquisition System

Figure 2:
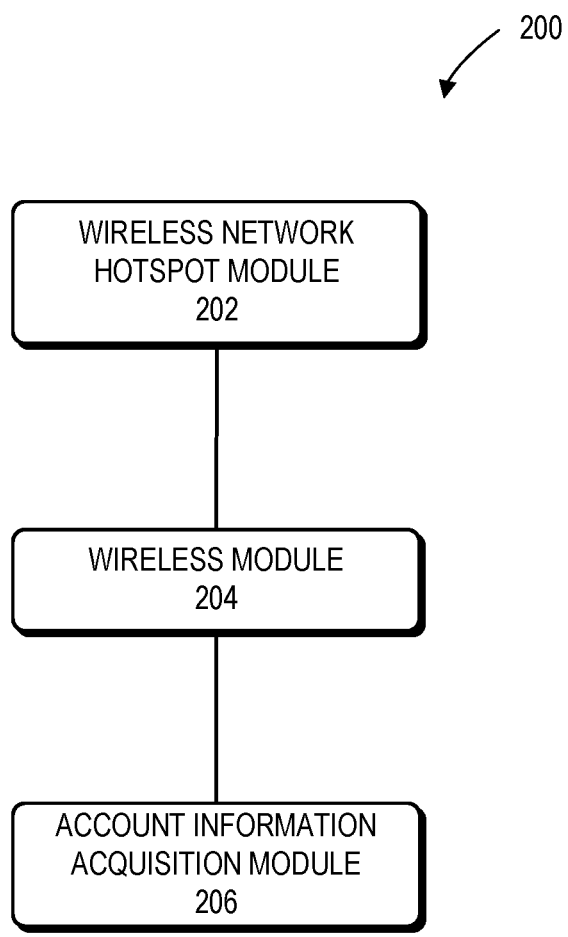
FIG. 2 presents a block diagram illustrating an exemplary wireless payment and account information acquisition system, in accordance with an embodiment of the present invention.

FIG. 2 presents a block diagram illustrating an exemplary wireless payment and account information acquisition system, in accordance with an embodiment of the present invention. System 200 may include a wireless network hotspot module 202, a wireless module 204, and an account information acquisition module 206. In some embodiments, modules 204 and 206 may be software applications and/or hardware modules executing and/or operating on a mobile device.

As illustrated in FIG. 2, the system includes wireless network hotspot module 202. Wireless network hotspot module 202 may provide a wireless network connection. Wireless network hotspot module 202 may associate an identifier of the wireless network hotspot, such as a media access control (MAC) address of the wireless network hotspot module, with a payee's account. The payee's account is an account that mobile users (e.g., passengers) make payment to and is associated with the installation location of the wireless network hotspot module. For instance, if the wireless network hotspot module is installed on the bus, the payee's account refers to the account for receiving transport fares on the bus and the system associates the identifier of the wireless network with the bus account.

The system may also include wireless module 204. Wireless module 204 may detect a wireless hotspot and connect to wireless network hotspot module 202 to acquire and transfer the identifier of the wireless network hotspot to account acquisition module 206. For example, when the user's mobile device detects the wireless network hotspot using wireless module 204, wireless module 204 may connect with the wireless network hotspot and access the wireless network provided by wireless network hotspot module 202. Wireless module 204 may acquire the identifier of the wireless network hotspot and transfer the identifier information to the modules.

Account information acquisition module 206 may send a request for account information to the server with the identifier of the wireless network hotspot.

The server may store data associating the identifier of the wireless network hotspot and the payee's account. Upon receiving the account information request, the server may determine the payee's account that is associated with the wireless network hotspot. The server may determine the payee's account information by using stored data that corresponds (e.g., associates, matches, or maps) the payee's account with the identifier of the wireless network hotspot. The server may then return the payee's account information to the account information acquisition module 206, thereby establishing a network connection over the wireless network with the server.

Note that wireless module 204 is connected with account information acquisition module 206. Wireless module 204 is connected with wireless network hotspot module 202 via a wireless network, and account information acquisition module 206 is connected with wireless network hotspot module 202 via wireless module 204.

With the system depicted in FIG. 2, users do not need to input the payee's account information, thereby ensuring the correctness of payee's account information. Furthermore, the entire payment process is more convenient and completed more quickly.

Exemplary Process For Wirelessly Acquiring Account Information

Figure 3:
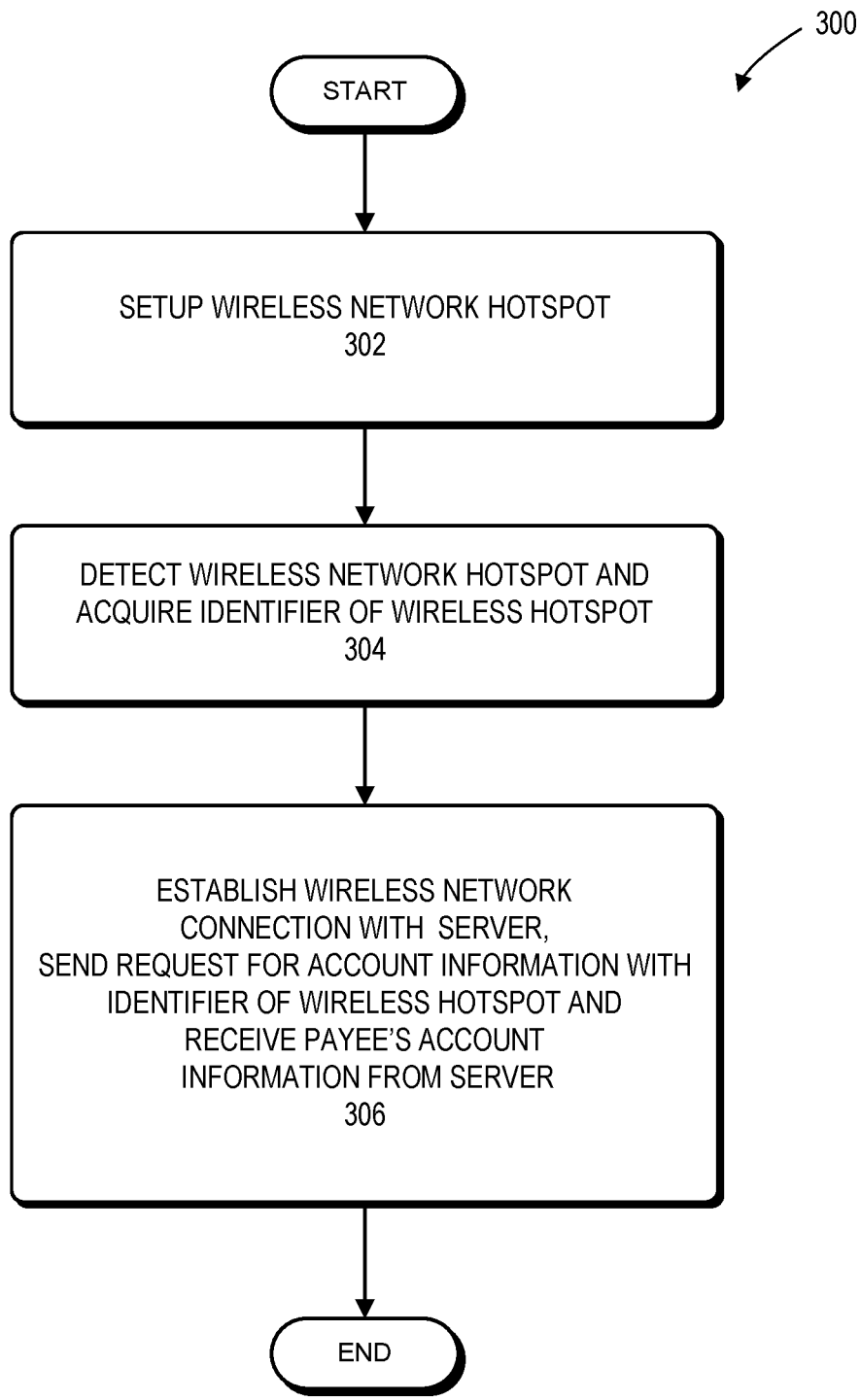
FIG. 3 presents a flowchart illustrating an exemplary process for wirelessly acquiring account information, in accordance with an embodiment of the present invention.

FIG. 3 presents a flowchart illustrating an exemplary process for wirelessly acquiring account information, in accordance with an embodiment of the present invention. During operation, the system may initially set up a wireless network hotspot that has an identifier associated with a payee's account (operation 302). The system may associate the identifier of the wireless network hotspot (e.g., MAC address of wireless network hotspot module) with the payee's account. A server may store data associating the identifier of the wireless network hotspot and the payee's account.

The system (e.g., a wireless module) may then detect the wireless network hotspot and acquire (e.g., obtain) the identifier of the wireless network hotspot (operation 304). The system may establish a connection with the wireless network hotspot to obtain the identifier of the wireless network hotspot.

The system may establish a wireless network connection with the server. The system sends a request for account information to the server with the identifier of the wireless network hotspot, and receives the payee's account information returned by the server. The server may identify the payee's account corresponding to the wireless network hotspot based on stored data associating the payee's account and the identifier of the wireless network hotspot, and send back the payee's account information (operation 306). Thus, information regarding the account to which users make payment is available after the server sends back the payee's account information. The system (e.g., the server) may also store data associating the payee's account with the location of the wireless network hotspot. Examples of payee's accounts include accounts for bus fares, taxis, or charge accounts in stores.

Exemplary Wireless Payment System

Figure 4:
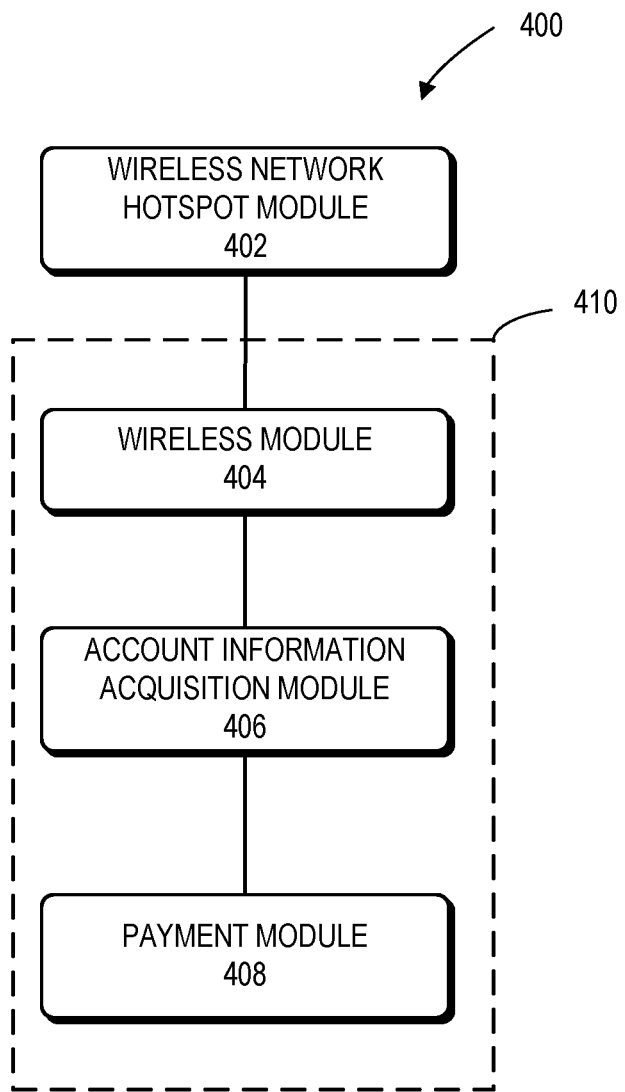
FIG. 4 presents a block diagram illustrating an exemplary wireless payment system, in accordance with an embodiment of the present application.

FIG. 4 presents a block diagram illustrating an exemplary wireless payment system, in accordance with an embodiment of the present application. A wireless payment system 400 may include a wireless network hotspot module 402, a wireless module 404, an account information acquisition module 406, and a payment module 408. Wireless payment system 400 may be formed by adding payment module 408 to system 200 of FIG. 2. In some embodiments, modules 404-408 may be software applications or hardware modules or some combination thereof executing and/or operating on a mobile device. Module 402 may be located on a bus, at a store, or some other location.

In some embodiments, a client application 410 installed on a passenger's mobile device to perform the payment operations may include wireless module 404, account information acquisition module 406, and payment module 408.

Wireless network hotspot module 402 may provide a wireless network connection. Wireless network hotspot module 402 may associate an identifier of the wireless hotspot with the payee's account. A server may also store such data representing the association in a storage device.

Wireless module 404 may detect a wireless hotspot and connect to wireless network hotspot module 402 to acquire and transfer the identifier of the wireless network hotspot to payment module 408 and/or account information acquisition module 406.

Account information acquisition module 406 may send a request for account information to the server with the wireless network identifier and receive the payee's account information from the server. Account information acquisition module 406 may establish a wireless network connection with the server via wireless module 404.

Payment module 408 may generate payment orders to make payment to the payee's account as the target account. Payment module 408 is connected with account information acquisition module 406. Upon acquiring payee's account information from the account information acquisition module 406, payment module 408 may store data listing the payee's account as the target account for payment and generate a payment order. The system then displays the payment order on a user interface, including an input box for the amount of payment and submission buttons. When users input the amount of payment and then click to submit the order, payment module 408 submits the order to the server to complete the payment.

Wireless network hotspot module 402 is connected with wireless module 404, account information acquisition module 406, and payment module 408 via wireless network, and wireless module 404 is connected with account information acquisition module 406 and payment module 408. With the use of the wireless payment device, the system automatically acquires the payee's account information, and users are not required to input payee's account information, thereby facilitating payment while avoiding payment errors due to mistakes in account information input.

Figure 5:
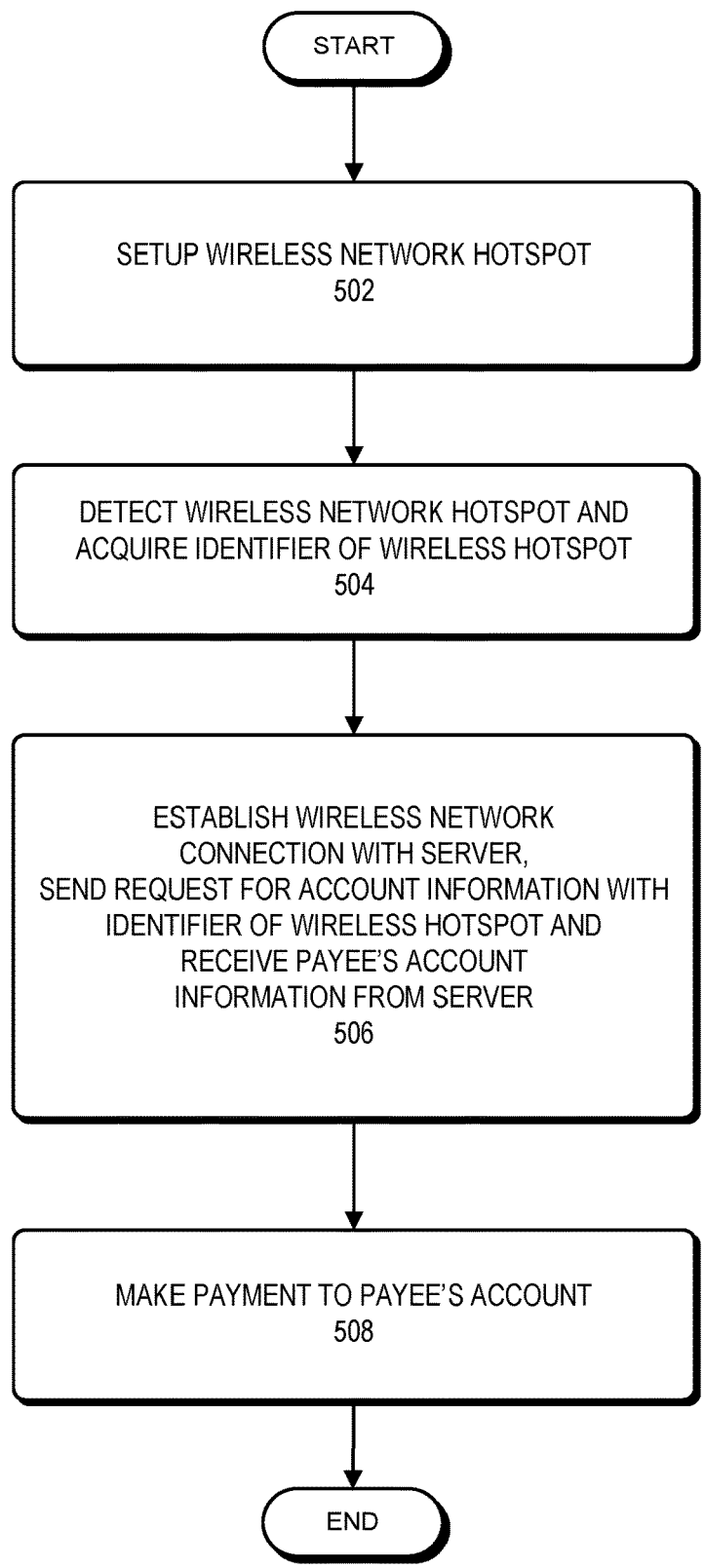
FIG. 5 presents a flowchart illustrating an exemplary process for making a wireless payment, in accordance with an embodiment of the present application.

FIG. 5 presents a flowchart illustrating an exemplary process for making a wireless payment, in accordance with an embodiment of the present application. During operation, the system (e.g., a wireless network hotspot module) may set up a wireless network hotspot and associate an identifier of the wireless network hotspot with a payee's account (operation 502). The system (e.g., a mobile device) may then detect the wireless network hotspot and acquire the identifier of the wireless network hotspot (operation 504). The system may then establish a wireless network connection with a server, send a request for account information to the server with the identifier of the wireless network hotspot, and receive the payee's account information from the server (operation 506). The system may then make a payment to the payee's account (operation 508).

Figure 6:
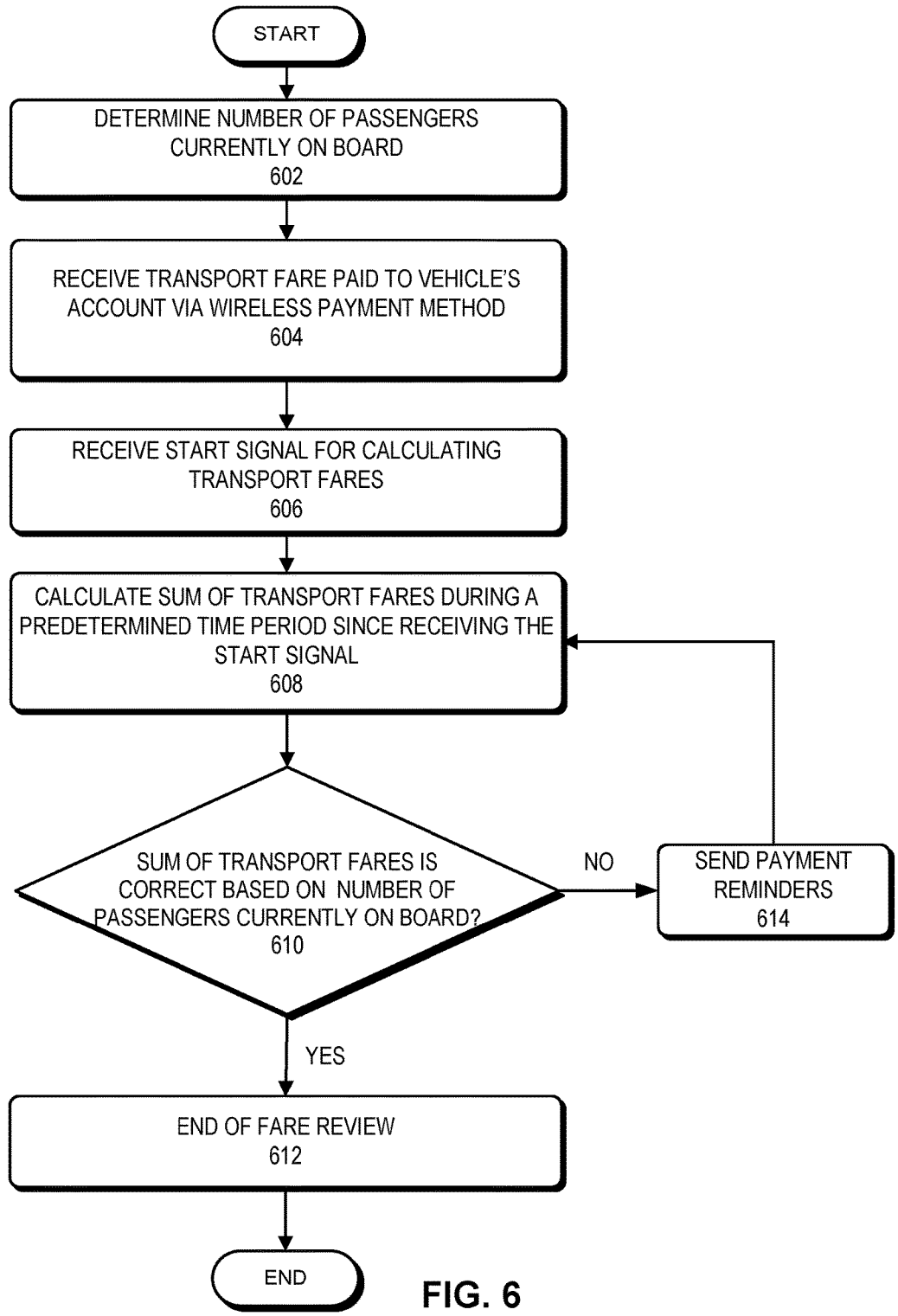
FIG. 6 presents a flowchart illustrating an exemplary process for checking public transport fare, in accordance with an embodiment of the present application.

FIG. 6 presents a flowchart illustrating an exemplary process for checking public transport fare, in accordance with an embodiment of the present application. During operation, the system may initially determine the number of passengers currently on board (operation 602). For example, the system may determine the number of passengers boarding at a bus stop starting from the moment when the entrance door of the bus opens and passengers start to get on the bus. In one embodiment, the system may use an image recognition method to verify the number of passengers on board the bus. A camera installed above the entrance doors may capture the images of passengers on board. In order to get clearer images, the camera is preferably installed above and opposite the entrance door, enabling the camera to get clear images of the heads of passengers. Filming may start as the entrance door is opened and may stop as the door closes.

Alternatively, the camera starts filming during a predetermined time period after the entrance door opens. The predetermined time period can be determined through experiments. For example, the system may determine the average boarding time based on experiments. The time period should be shorter than the traveling time between two bus stops. The number of passengers on board can be verified using image recognition technology based on the images captured by cameras. For instance, the system may identify the heads in the last frame of the video to verify the number of passengers on board. The system may also verify the heads in each frame and then calculate the number of passengers on board using statistical techniques. As passengers usually move backward after boarding the vehicle and passengers already on the vehicle may have been previously filmed, there can be errors in counting the number of passengers on board with conventional image recognition technology.

In order to improve the identification accuracy of passenger number, the system may utilize an optical flow field technique. The optical flow field technique contains motion information of each moving object. The same object has a continuous inner optical flow field while different moving objects produce different optical flow fields. Moreover, the optical flow fields of different objects are very different and discontinuous. Thus, the optical flow field technique can recognize moving objects more clearly.

The optical flow field method used in image recognition may include: building a background model of images to obtain a moving foreground; calculating the optical flow field of the moving foreground using the Horn-Schunck method; optimizing the calculation of optical flow field; and eliminating interference factors to determine the number of passengers on board.

In order to obtain an accurate number of boarded passengers, the system may set a boarding area and time for filming on the vehicle during the temporary stay of the passengers until the filming period ends. In this way, the effect of passengers' movement is greatly reduced and so is the error in calculating the number of passengers currently on board.

In some embodiments, the system may determine the number of passengers currently on board using an infrared detecting method. For instance, the entrance area may be equipped with two parallel infrared sensors separated by a predetermined distance (e.g., 20 cm). The system may determine the direction of the passengers' movements based on the sequence of blocked lights. The system can thereby determine (and/or verify) the number of passengers getting on and off the vehicle since there must be a person walking by when the lights are blocked. However, the accuracy can be low in case of crowding.

The system may also determine the number of passengers currently on board by using a pressure testing method. For instance, the threshold below the entrance door can be equipped with pressure sensors. As the threshold is usually narrow, passengers will typically only step on it with one foot. The number of times that the pressure sensor senses the pressure during the period from entrance door opening to closing is equal to the number of passengers currently on board.

The system may transmit the number of passengers currently on board to a microprocessor control unit (MCU), which may store the number of passengers traveling on board. In this disclosure, the MCU may be a control unit controlled by a microprocessor, such as a microcontroller. When using the methods involving the infrared sensor or the pressure sensor, the MCU may calculate the number of passengers according to the sensor signals received. When using the image recognition method, the system may determine the number of passengers and transmit this information to the MCU.

The system may accept the transport fare paid to the vehicle's account via a wireless payment method (operation 604). The vehicle can be equipped with a wireless network and the wireless network signal can be such as that provided by Chinanet. The wireless network can be a dedicated wireless network for vehicles, such as the widely used E-net on buses. The system may maintain a dedicated account for a vehicle, and the system may use the dedicated account to collect transport fares from passengers. The system may store data binding the dedicated account with the identifier of the wireless network hotspot.

Figure 10:
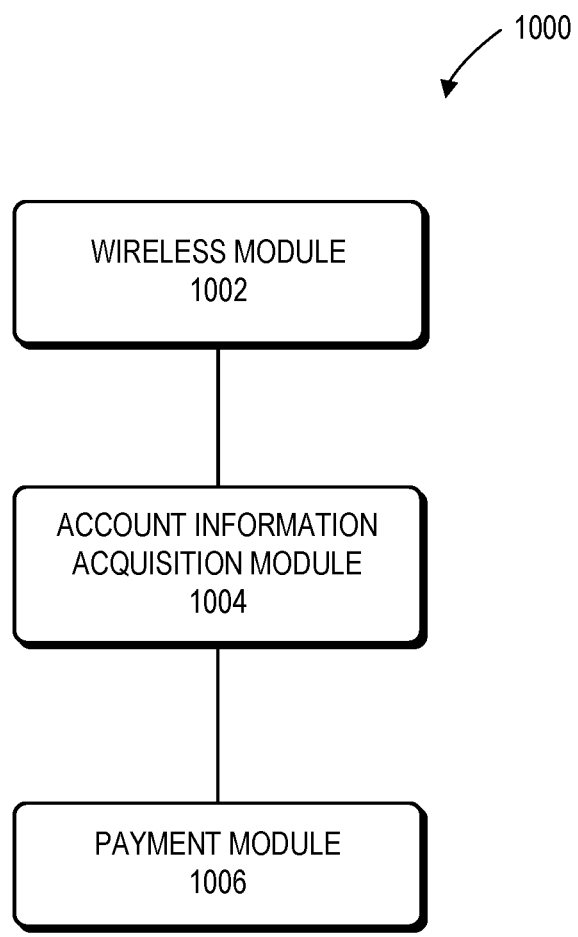
FIG. 10 presents a block diagram illustrating an exemplary payment terminal, in accordance with an embodiment of the present invention.

When a payment client detects and connects to the wireless network hotspot, the payment client obtains the identifier of the wireless network hotspot, and then sends the request for account information to the server with the identifier. The payment client may receive the account information of the public transport vehicle from the server. Thus, passengers are not required to input the account number of the vehicle while accurately completing payment of transport fares. In some embodiments, the payment client may include the wireless module, account information acquisition module, and payment module, as depicted in FIG. 10 and reference number 410 of FIG. 4.

The payment module of the payment client can be a payment module of a third-party payment client, such as an Alipay payment module. Alipay is a third-party online payment platform in China. The payment client may be installed on a passenger's mobile device. There may be a dedicated account opened for each transportation vehicle on a payment platform such as Alipay. The system should open the dedicated account in advance before beginning operation and receiving fares, and a passenger may transfer the transport fare to the account via the passenger's payment client installed on the passenger's mobile device.

The system may record the transport fare paid by each passenger after the transport fare is received. A third-party payment client, such as Alipay, may collect the payment of transport fares.

The system may receive a start signal for calculating transport fares (operation 606). The signal to start calculating transport fares may be the opening of the door, e.g., the signal which is sent by a door opening mechanism of the vehicle when opening the entrance door. The driver or accompanying conductor may also send the start signal for calculating transport fares using a button-operated control device. The driver or accompanying conductor may press the button to send a control signal which is the start signal for calculating transport fares.

The door opening mechanism may be connected with the MCU and may transmit the control signal or the door opening signal to the MCU, and these signals may serve as a start signal. In some embodiments, upon reception of the signal, MCU may transmit the start signal for calculating transport fares to the payment client for receiving passenger fares (e.g., the payee's payment client). The payment client for receiving passenger fares may perform the calculation in operation 608.

In some embodiments, the payee's payment client that receives passenger fares transmits the passengers' boarding information to the MCU for storage via wireless network, mobile network or wired connections. MCU may perform the calculation operations after receiving a start signal for calculating transport fares.

The system may calculate the sum of transport fares during a predetermined time period since receiving the start signal (operation 608). The payment client that receives passengers' fares (or MCU) calculates the total fare during the predetermined time duration upon receiving the signal for calculating transport fares. The predetermined time duration should be shorter than the travelling period between any two neighboring bus stops, e.g., the calculation of fares should be completed before the vehicle arrives at the next stop. If passengers have to pay extra fares, the time taken for such steps may be negligible as the driver controls the entrance door. Thus, the predetermined time duration should be shorter than the travelling period between any two neighboring bus stops. The travelling time period between two neighboring bus stops is usually fixed, and thus the predetermined time duration may be determined based on actual circumstances.

In some embodiments, the total fare of all passengers during the predetermined time duration may be the sum of each fare added for each passenger since receiving the start signal for calculating transport fares. As passengers need time to make payments, the system may postpone the calculating of total fare until after the signal for calculating transport fares is received, e.g., the calculating of the initial fare during the predetermined time period may be postponed. The system may determine the postponement period through experiments based on the average time for making payments after passengers board the vehicle. Each of passengers' extra fares should also be added to the initially calculated fare.

The system may determine if the sum of the transport fares is correct based on the number of passengers currently on board (operation 610). The payment client may receive the total fare during the predetermined time period after receiving the start signal for calculating transport fares. If the payment client receives the passenger fares, the system may transmit the calculated fares to MCU via wireless network, mobile communication network or wired connections.

If the MCU performs the calculating of fares, the transmission is unnecessary. MCU calculates the fares due according to the number of passengers currently on board, e.g., fares due=the number of passengers currently on board×transport fare. The transport fare refers to the fare charged for the particular route. For instance, in a shuttle bus, the number of passengers may be 10 and if the transport fare is 2 RMB, then the total due fares should be 20 RMB. MCU may compare the calculated total transport fares with the total transport fares actually received. If they are equal, then the sum of calculated transport fares is correct, and the checking of transport fare ends and the system may display the notice of correct results to the driver or accompanying conductor on a screen.

If there are errors in calculating the total transport fares, it might not be a result of some passengers failing to make the payment, but the amount of payment or calculation may be incorrect. In some embodiments, to determine whether the passengers failed to pay or the calculated amount is incorrect, the number of passengers who made payments to the vehicle's account during the predetermined time period since receiving the start signal can be checked against the number of passengers currently on board. If the numbers are different, this means that there are passengers who failed to make payment, and the system may send a reminder to urge payment, and then the system returns to operation 608.

The system (e.g., payment client application that receives passengers' fares) may transmit the number of passengers who made payments to the vehicle's account to MCU via wireless network, mobile communication network or wired connections. The MCU determines whether the number of passengers who made payments to the vehicle's account is equal to that of the number of passengers currently on board.

If the sum of transport fares is correct, the system is finished calculating and reviewing the passenger fares (operation 612).

If the sum of transport fares is incorrect, the system may send a reminder to the passengers to make payment (operation 614), and continue with operation 608. If the calculated sum of transport fares is incorrect, the system may send a reminder to urge payment. For instance, a broadcasting device may broadcast payment reminders, or the driver or accompanying conductor can urge passengers to make payments. After sending the payment reminder, the system may continue with operation 608. The system may re-calculate the total transport fare during the predetermined time period and can add the payments made afterward to the previously computed sum of transport fares. The system again continues with operation 610 to check the sum of the transport fares for correctness after re-calculating. If correct, the system is finished with checking the transport fare.

Figure 7:
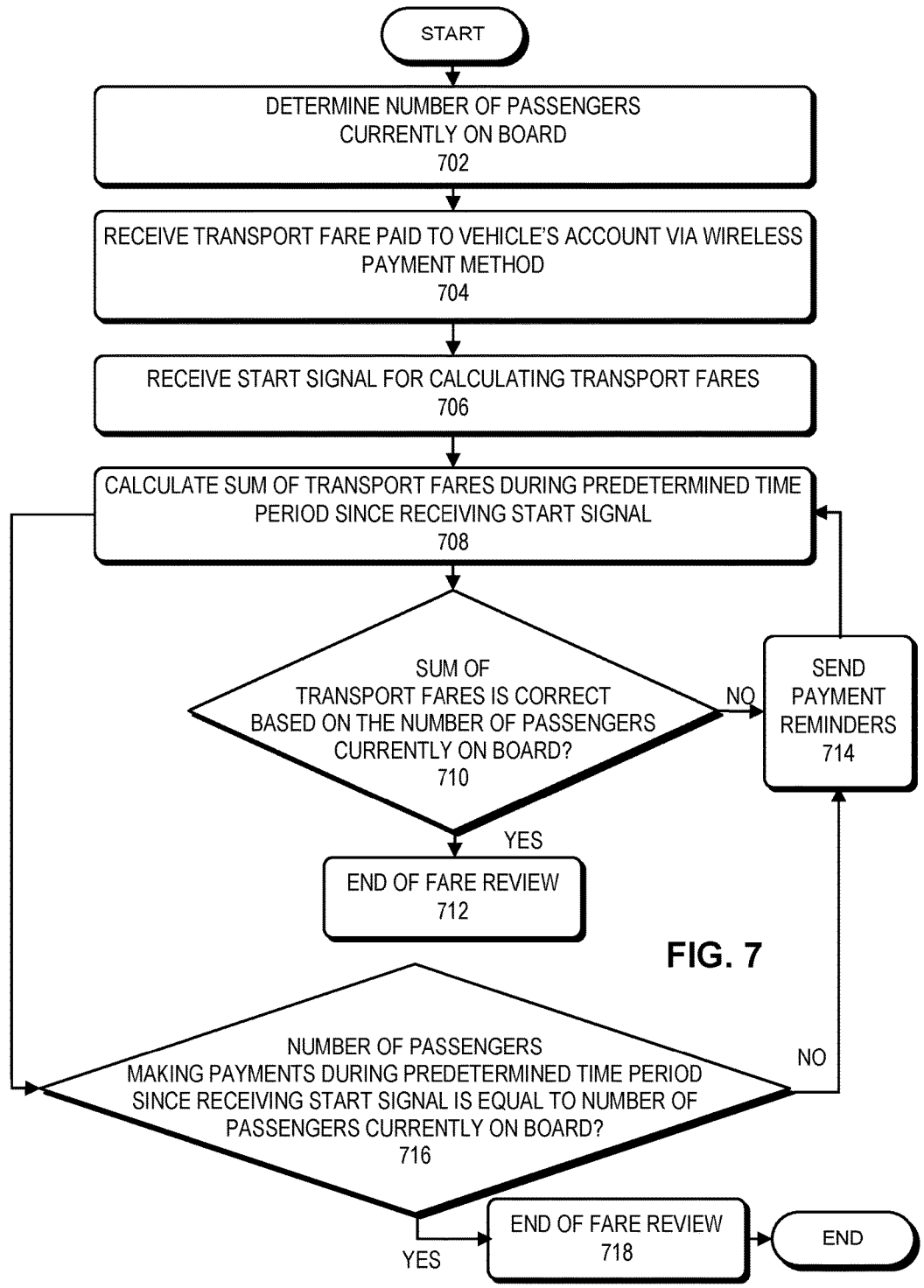
FIG. 7 presents a flowchart illustrating an exemplary process for checking public transport fare, in accordance with an embodiment of the present application.

FIG. 7 presents a flowchart illustrating an exemplary process for checking public transport fare, in accordance with an embodiment of the present application. During operation, the system may initially determine the number of passengers currently on board (operation 702). The system may then receive transport fare paid to the vehicle's account via a wireless payment method (operation 704). The system may then receive a start signal for calculating transport fares (operation 706). The system may then calculate the sum of transport fares during the predetermined time period since receiving the start signal for calculating transport fares (operation 708).

The system may determine if the sum of transport fares is correct based on the number of passengers currently on board (operation 710). If the sum of transport fares is correct, the system is finished with calculating the passenger fares (operation 712). If the sum of transport fares is incorrect, the system may send payment reminders (operation 714) and continue with operation 708.

The system may determine if the number of passengers who make payments to the vehicle's account during the predetermined time period since receiving the start signal for calculating transport fares is equal to the number of passengers currently on board (operation 716). If the numbers are not equal, the system may send a payment reminder (operation 714) and return to operation 708. If the numbers are equal, the system is finished with calculating passenger fares (operation 718)

If there are errors in calculating the total transport fares, it might not be a result of some passengers failing to make the payment, but the amount of payment or calculation may be incorrect. In some embodiments, to determine whether the passengers failed to pay or the calculated amount is incorrect, the number of passengers who made payments to the vehicle's account during the predetermined time period since receiving the start signal can be checked against the number of passengers currently on board. If the numbers are different, this means that there are passengers who failed to make payment, and the system may send the reminder to urge payment, and then the system returns to operation 708 to re-calculate the sum.

A payment client application that receives passenger fares may send the number of passengers who make payments to the MCU. The MCU may determine whether the number of passengers who made payments to the vehicle's account is equal to that of the number of passengers currently on board.

Since clients can make payment simultaneously from a distance, passengers do not need to queue up, thereby improving boarding efficiency and preventing traffic jams. In addition, by determining the number of passengers on board, the system can detect whether there are passengers that failed to make payments or some errors occurred in making payments, thereby ensuring correctness in calculating fares.

Exemplary Transport Fare Checking System

Figure 8:
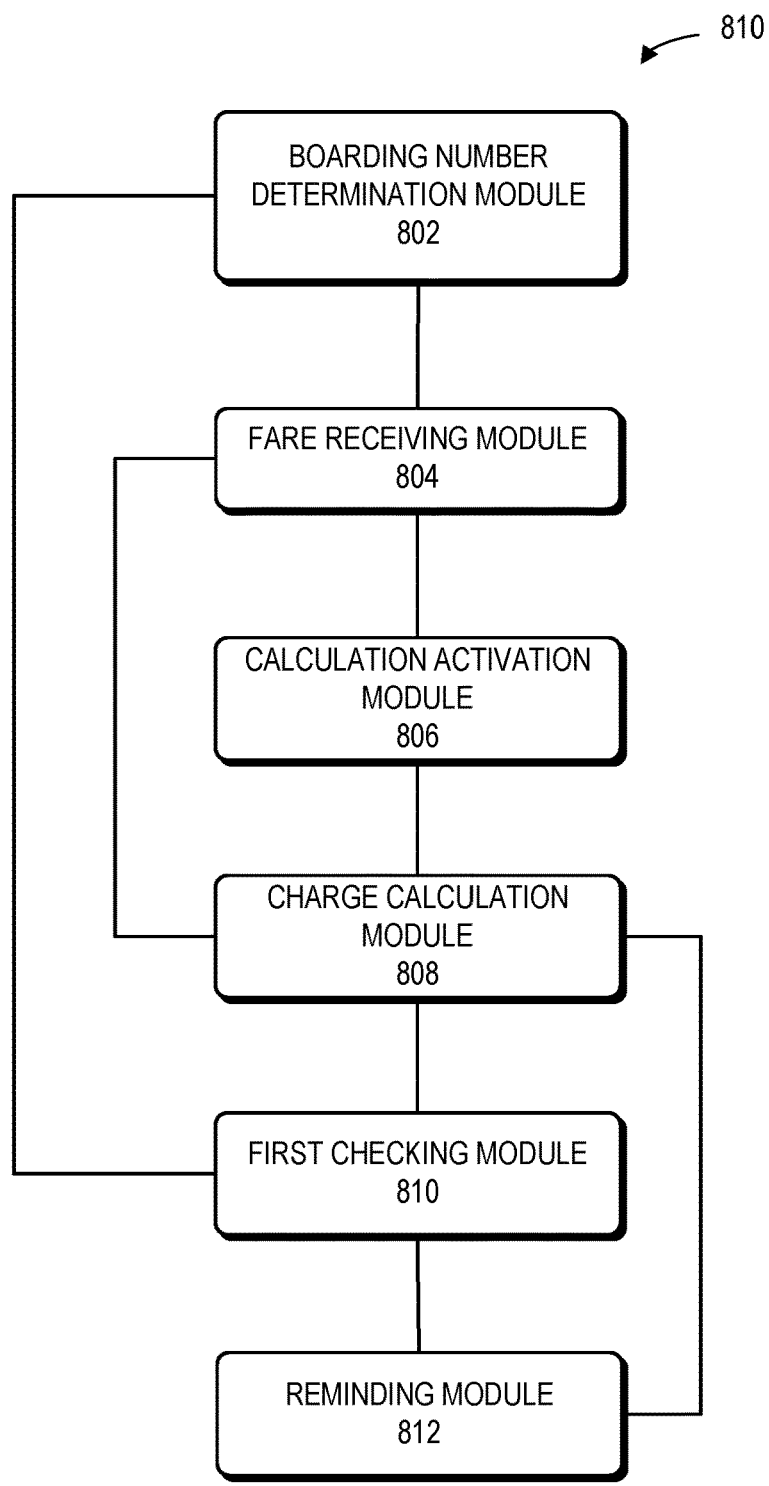
FIG. 8 presents a block diagram illustrating an exemplary transport fare checking system, in accordance with an embodiment of the present application.

FIG. 8 presents a block diagram illustrating an exemplary transport fare checking system, in accordance with an embodiment of the present application. As shown in FIG. 8, the system may include a boarding number determination module 802, a fare receiving module 804, a calculation activation module 806, a charge calculation module 808, a first checking module 810, and a reminding module 812. In some embodiments, transport fare checking system 800 is an apparatus.

Boarding number determination module 802 may determine the number of passengers currently on board. Fare receiving module 804 receives fares paid to the vehicle's account via a wireless payment device. The vehicle's account is the payee's account. Calculation activation module 806 may receive a start signal for calculating transport fares. Charge calculation module 808 may calculate the sum of total transport fares during the predetermined time period since receiving the start signal for calculating transport fare. The connections of charge calculation module 808 with calculation activation module 806 and fare receiving module 804 may be wired or wireless, such as wireless network connections via a mobile communication network or wireless network.

First checking module 810, connected with boarding number determination module 802 and charge calculation module 808, may check the sum of transport fares against the number of passengers currently on board. Reminding module 812, connected with first checking module 810 and charge calculation module 808, may send payment reminders if the sum of transport fares is incorrect and return operation to charge calculation module 808.

In some embodiments, boarding number determination module 802 may include a filming subunit installed above entrance doors of vehicles for obtaining images of passengers on board and a recognition subunit for recognizing images using the optical flow field method. With these modules, the system may verify the number of passengers currently on board.

In some embodiments, boarding number determination module 802 may include infrared sensors, installed on the passengers' entrance for detecting when passengers pass by. The module may also include a calculation subunit, connected with the infrared sensors, to calculate the number of passengers currently on board based on the signal data from the infrared sensors.

In some embodiments, boarding number determination module 802 may also include pressure sensors, installed on the threshold of the entrance door for detecting pressure signals when passengers step on them. The module may also include a calculation subunit, connected with the pressure sensors for calculating the number of passengers currently on board based on the signals of the pressure sensors.

Calculation activation module 806 may be connected with door openers and uses door opening signals as the start signal for calculating transport fares. A control device operated by the driver or accompanying conductor may also serve to send the start signal for calculating transport fares.

Reminding module 812 may be connected with a broadcasting device to broadcast reminders to passengers to pay transport fares.

Each module of the system may include a MCU (e.g., microcontroller) or is connected with or integrated into the MCU and the MCU performs the corresponding calculations and program processing.

Exemplary Transport Fare Checking System

Figure 9:
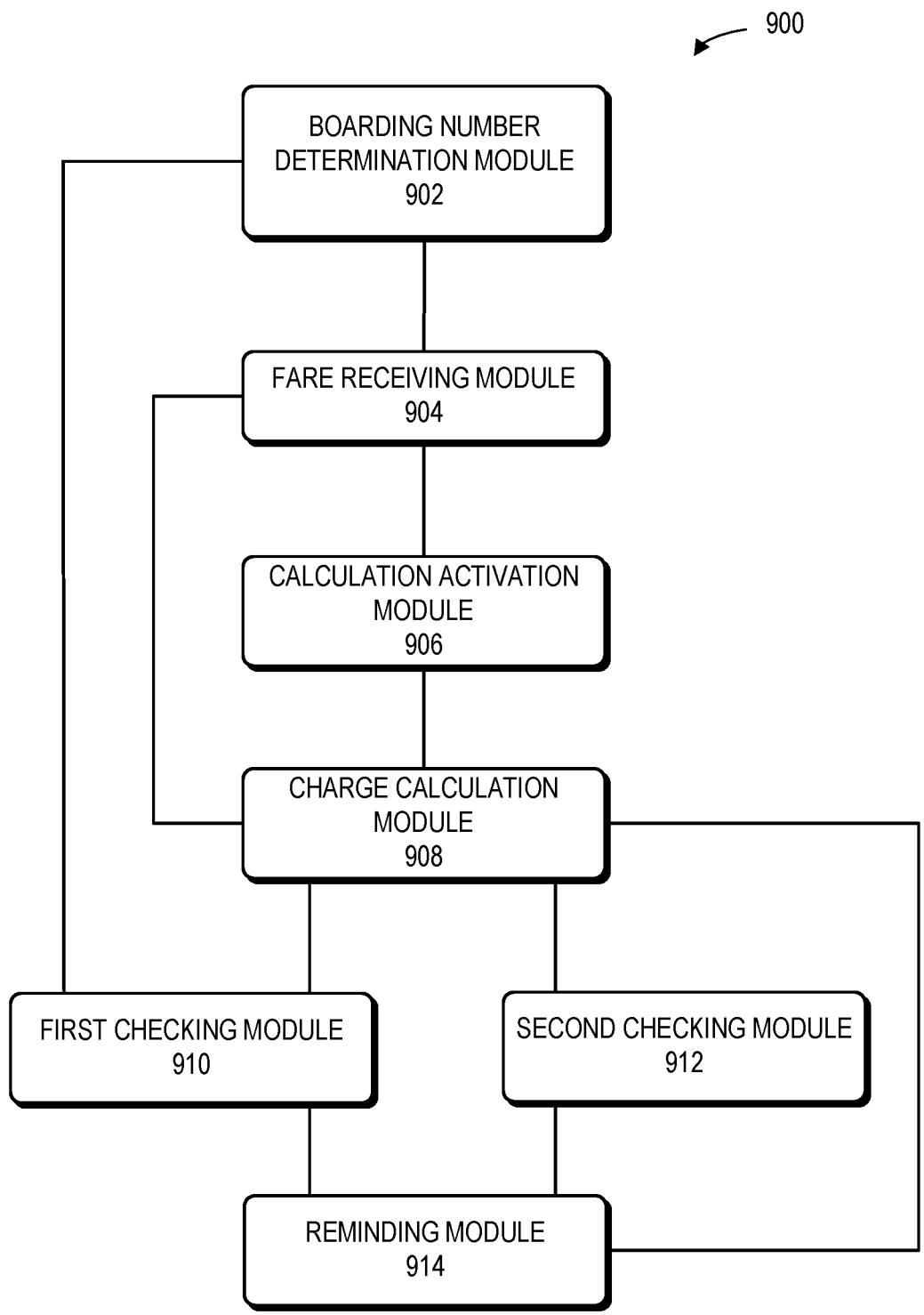
FIG. 9 presents a block diagram illustrating an exemplary transport fare checking system, in accordance with an embodiment of the present application.

FIG. 9 presents a block diagram illustrating an exemplary transport fare checking system, in accordance with an embodiment of the present application. As depicted in FIG. 9, the transport fare checking system 900 may include a boarding number determination module 902, a fare receiving module 904, a calculation activation module 906, a charge calculation module 908, a first checking module 910, a second checking module 912, and a reminding module 914. In some embodiments, transport fare checking system 900 is an apparatus.

Boarding number determination module 902 determines the number of passengers currently on board. Fare receiving module 904 may accept fares paid to the vehicle's account via a wireless payment device. The vehicle's account is also called the payee's account. Calculation activation module 906 may receive a start signal for calculating transport fares. Charge calculation module 908 may calculate the sum of transport fares during the predetermined time period since receiving the start signal for calculating transport fares. The connections of module 908 with module 904 and module 906 may be wired or wireless, such as a wireless network connection via a mobile communication network or wireless network.

First checking module 910, connected with boarding number determination number 902 and charge calculation module 908, may check the sum of transport fares against the number of passengers currently on board. Second checking module 912 may check the number of passengers who make payments to the vehicle's account during the predetermined time period since receiving the start signal for calculating transport fares against the number of passengers currently on board. The connection of the checking units with the other modules may be wired or wireless, such as a wireless network connection via a mobile communication network or a wireless network.

Reminding module 914, connected with the checking modules, may send payment reminders and return operation to the charge calculation module 908 in case the sum of transport fares is incorrect or the sum is not consistent with (e.g., or equivalent to) the result of second checking module.

Exemplary Payment Terminal

FIG. 10 presents a block diagram illustrating an exemplary payment terminal, in accordance with an embodiment of the present invention. The payment terminal 1000 can also be referred to as a payment client, and can be implemented as an apparatus. Payment terminal 1000 may include a wireless module 1002, an account information acquisition module 1004, and a payment module 1006. Wireless module 1002 may detect a wireless network hotspot and connect with the wireless network hotspot to acquire the identifier of the wireless network hotspot, and transmit the identifier to payment module 1006.

Account information acquisition module 1004 may send a request for account information to a server and receive the payee's account information from the server. Account information acquisition module 1004 may establish a wireless network connection with the server via wireless module 1002.

Payment module 1006 may generate payment orders with the payee's account as the target account for payment.

Payment terminal 1000 can detect wireless network hotspot at locations such as on vehicles and obtain the identifier of a wireless network hotspot. After obtaining the identifier of the wireless network hotspot, payment module 1006 may automatically generate payment orders, thus allowing users to make payments for expenses such as transport fares. Payment terminal 1000 may be implemented as client software that can be installed on users' mobile devices and be easily carried around.

Exemplary Payee's Terminal

Figure 11:
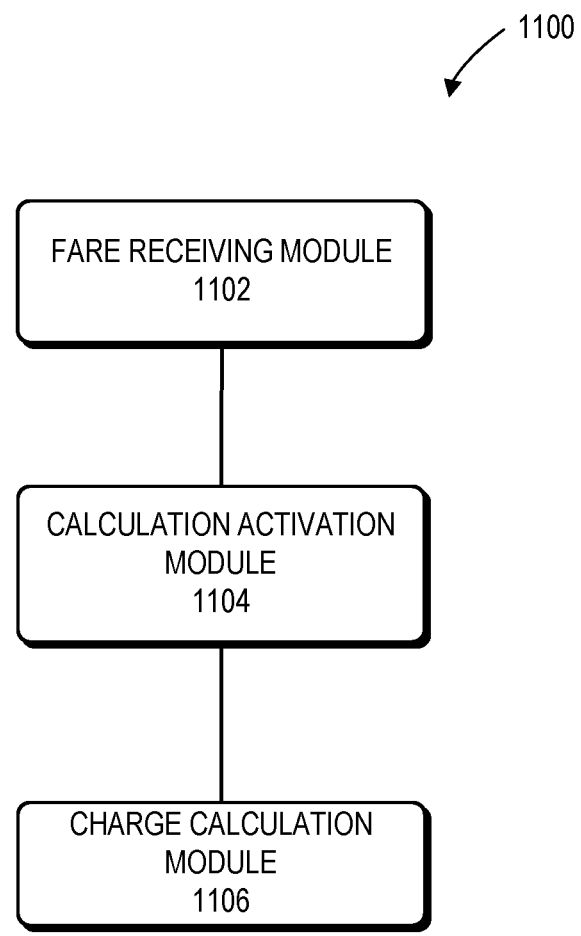
FIG. 11 presents a block diagram illustrating an exemplary payee's terminal, in accordance with an embodiment of the present invention.

FIG. 11 presents a block diagram illustrating an exemplary payee's terminal, in accordance with an embodiment of the present invention. The payee's terminal is also referred to as the payee's client, and can be implemented as an apparatus. As depicted in FIG. 11, a payee's terminal 1100 may include a fare receiving module 1102 for receiving transport fares paid to the vehicle's account. The payee's terminal may also include a calculation activation module 1104 for receiving a start signal for calculating transport fares, and a charge calculation module 1106 for calculating the sum of transport fares during the predetermined time period since receiving the start signal for calculating transport signal.

The payee's terminal may, upon receiving payment, calculate the sum of the transport fares based on the start signal for calculating transport fares. Users can check their charge for correctness according to the sum of the transport fares.

Exemplary Transport Fare Checking System

Figure 12:
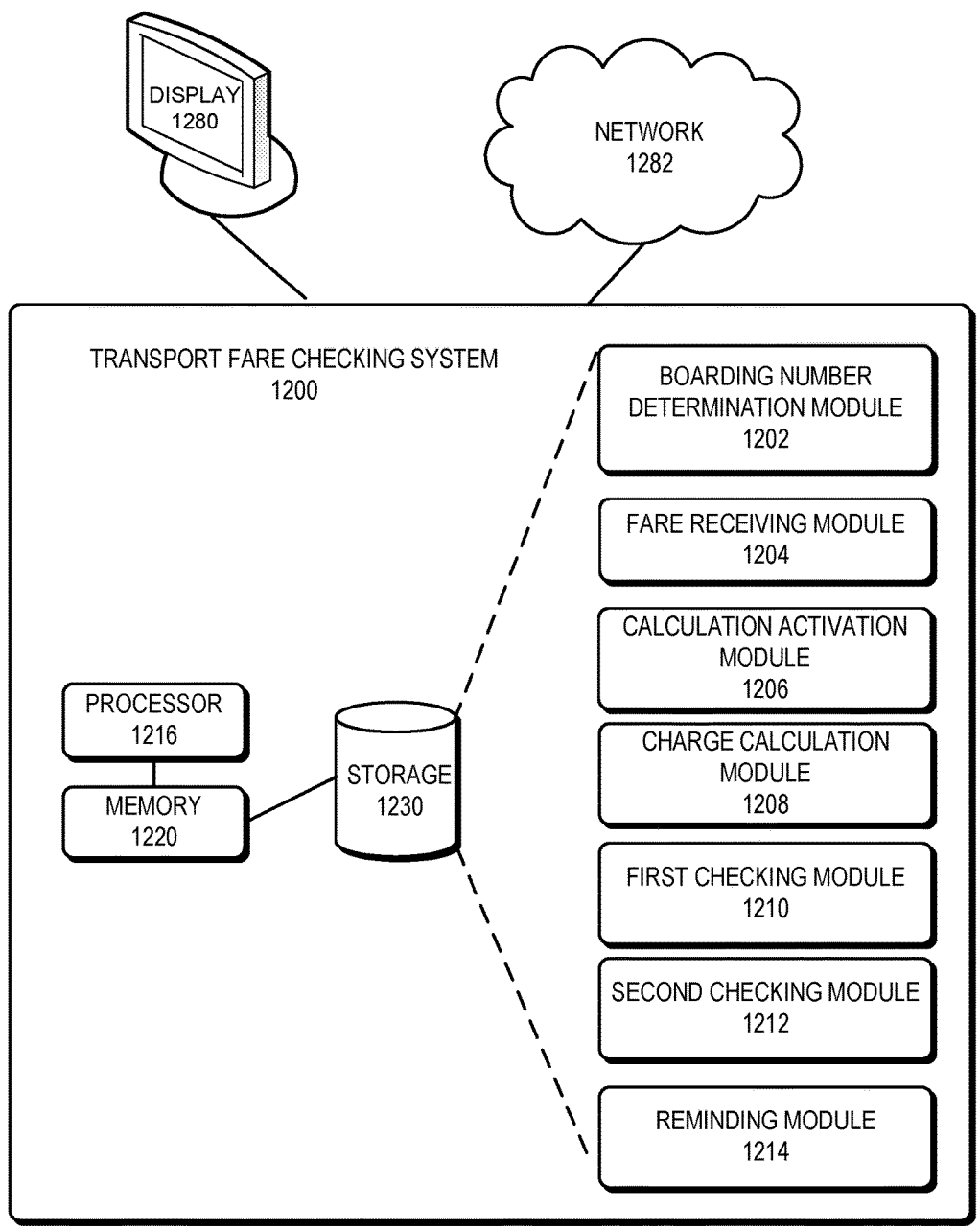
FIG. 12 presents a block diagram illustrating an exemplary transport fare checking system, in accordance with an embodiment of the present application.

FIG. 12 presents a block diagram illustrating an exemplary transport fare checking system, in accordance with an embodiment of the present application. In some embodiments, transport fare checking system 1200 may perform part of the functions of server 116 from FIG. 1. Transport fare checking system 1200 includes a processor 1216, a memory 1220, and a storage device 1230. Storage 1230 typically stores instructions that can be loaded into memory 1220 and executed by processor 1216 to perform the methods described above. In one embodiment, the instructions in storage 1230 can implement a boarding number determination module 1202, a fare receiving module 1204, a calculation activation module 1206, a charge calculation module 1208, a first checking module 1210, a second checking module 1212, and a reminding module 1214, which can communicate with each other through various means.

In some embodiments, modules 1202-1214 can be partially or entirely implemented in hardware and can be part of processor 1216. Further, in some embodiments, the transport fare checking system may not include a separate processor and memory. Instead, in addition to performing their specific tasks, modules 1202-1214, either separately or in concert, may be part of special-purpose computation engines.

Storage 1230 stores programs to be executed by processor 1216. Specifically, storage 1230 stores a program that implements a transport fare checking system (e.g., application) for making wireless payments. During operation, the application program can be loaded from storage 1230 into memory 1220 and executed by processor 1216. As a result, transport fare checking system 1200 can perform the functions described above. Transport fare checking system 1200 can further include a display 1280, and can be coupled via one or more network interfaces to a network 1282.

Boarding number determination module 1202 may determine the number of passengers currently on board. Fare receiving module 1204 receives fares paid to the vehicle's account via a wireless payment device. The vehicle's account is the payee's account. Calculation activation module 1206 may receive a start signal for calculating transport fares. Charge calculation module 1208 may calculate the sum of total transport fares during the predetermined time period since receiving the start signal for calculating transport fare. First checking module 1210 may check the sum of transport fares against the number of passengers currently on board. Second checking module 1212 may check the number of passengers who make payments to the vehicle's account during the predetermined time period since receiving the start signal for calculating transport fares against the number of passengers currently on board.

Reminding module 1214 may send payment reminders if the sum of transport fares is incorrect and return operation to charge calculation module 1208.

Exemplary Payment Terminal System

Figure 13:
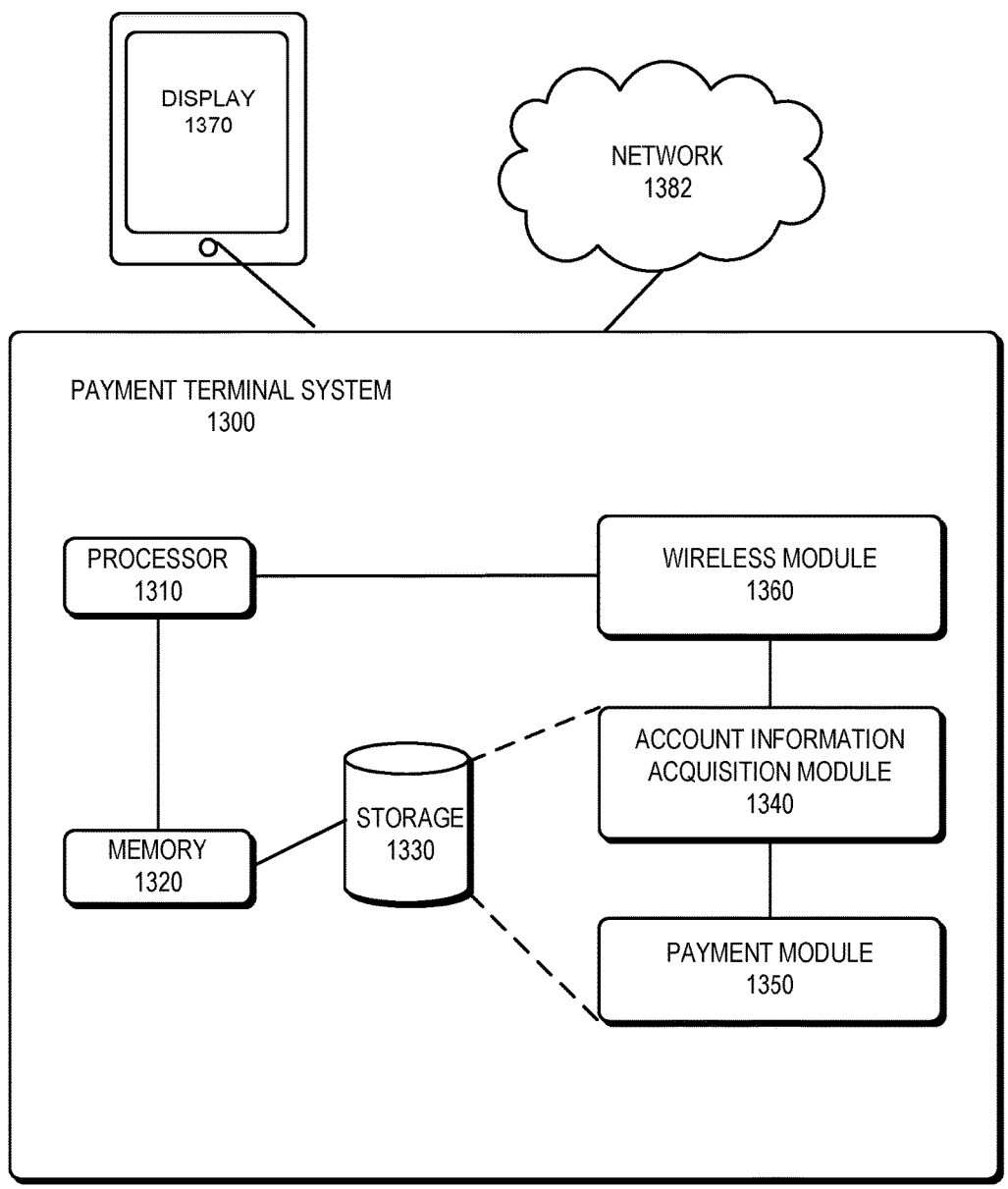
FIG. 13 presents a block diagram illustrating an exemplary payment terminal system, in accordance with an embodiment of the present application.

FIG. 13 presents a block diagram illustrating an exemplary payment terminal system, in accordance with an embodiment of the present application. Payment terminal system 1300 includes a processor 1310, a memory 1320, and a storage device 1330. Storage 1330 typically stores instructions that can be loaded into memory 1320 and executed by processor 1310 to perform the methods described above. In one embodiment, the instructions in storage 1330 can implement an account information acquisition module 1340 and a payment module 1350, which can communicate with each other through various means. Payment terminal system 1300 may also include a wireless module 1360. Instructions for controlling wireless module 1360 can also be stored in storage 1330.

In some embodiments, modules 1340-1360 can be partially or entirely implemented in hardware and can be part of processor 1310. Further, in some embodiments, the payment terminal system may not include a separate processor and memory. Instead, in addition to performing their specific tasks, modules 1340-1360, either separately or in concert, may be part of special-purpose computation engines.

Storage 1330 stores programs to be executed by processor 1310. Specifically, storage 1330 stores a program that implements a payment terminal system (e.g., application) for making wireless payments. During operation, the application program can be loaded from storage 1330 into memory 1320 and executed by processor 1310. As a result, payment terminal system 1300 can perform the functions described above. Payment terminal system 1300 further includes a display 1370, and can be coupled via one or more network interfaces to a network 1382.

Wireless module 1360 may detect a wireless network hotspot and connect with the wireless network hotspot to acquire the identifier of the wireless network hotspot, and transmit the identifier to payment module 1350.

Account information acquisition module 1340 may send a request for account information to a server and receive the payee's account information from the server. Account information acquisition module 1340 may establish a wireless network connection with the server via wireless module 1360.

Payment module 1350 may generate payment orders with the payee's account as the target account for payment.

Payment terminal system 1300 can detect wireless network hotspot at locations such as on vehicles and obtain the identifier of a wireless network hotspot. After obtaining the identifier of the wireless network hotspot, payment module 1350 may automatically generate payment orders, thus allowing users to make payments for expenses such as transport fares.

Exemplary Payee's Terminal System

Figure 14:
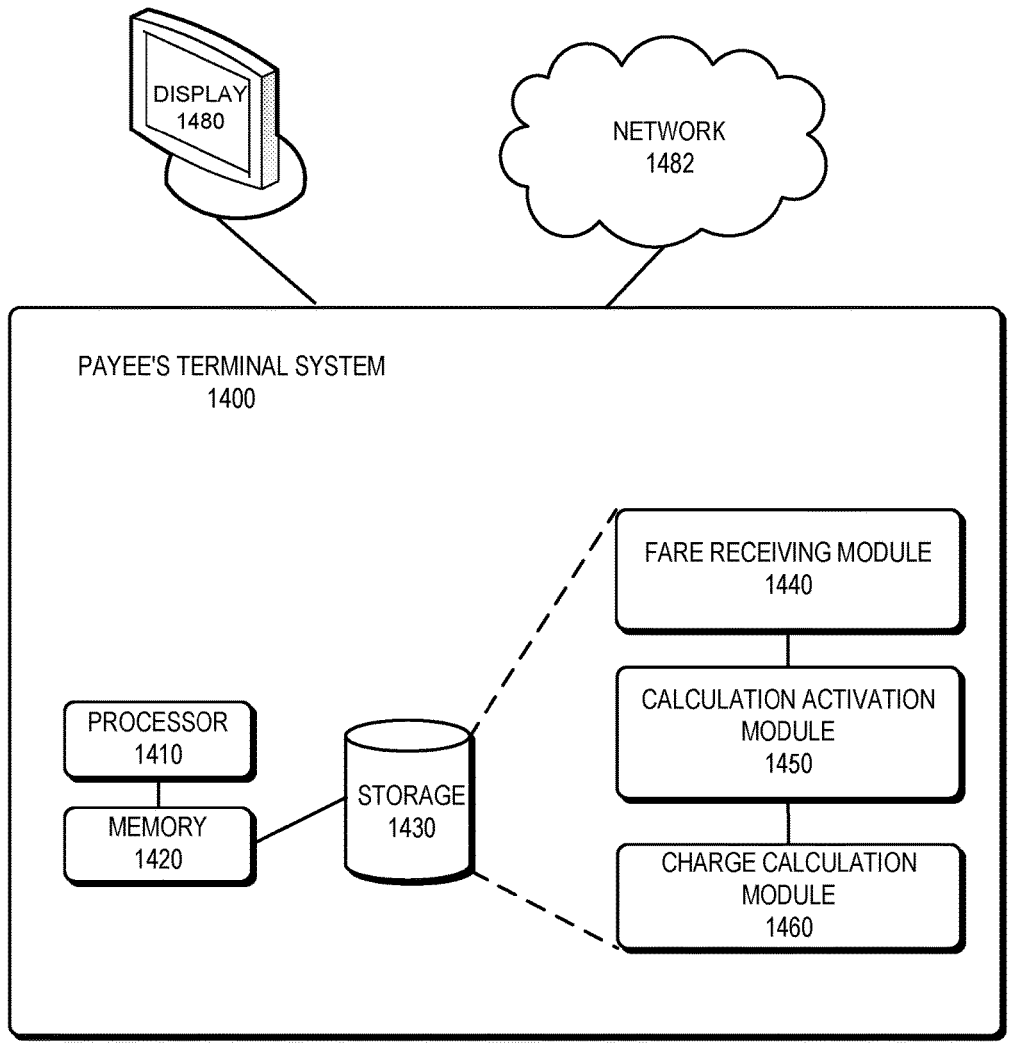
FIG. 14 presents a block diagram illustrating an exemplary payee's terminal system, in accordance with an embodiment of the present application.

FIG. 14 presents a block diagram illustrating an exemplary payee's terminal system, in accordance with an embodiment of the present application. Payee's terminal system 1400 includes a processor 1410, a memory 1420, and a storage device 1430. Storage 1430 typically stores instructions that can be loaded into memory 1420 and executed by processor 1410 to perform the methods described above. In one embodiment, the instructions in storage 1430 can implement a fare receiving module 1440, a calculation activation model 1450, and a charge calculation module 1460, which can communicate with each other through various means.

In some embodiments, modules 1440-1460 can be partially or entirely implemented in hardware and can be part of processor 1410. Further, in some embodiments, the payee's terminal system may not include a separate processor and memory. Instead, in addition to performing their specific tasks, modules 1440-1460, either separately or in concert, may be part of special-purpose computation engines.

Storage 1430 stores programs to be executed by processor 1410. Specifically, storage 1430 stores a program that implements a payee's terminal system (e.g., application) for making wireless payments. During operation, the application program can be loaded from storage 1430 into memory 1420 and executed by processor 1410. As a result, payee's terminal system 1400 can perform the functions described above. Payee's terminal system 1400 can further include a display 1480, and can be coupled via one or more network interfaces to a network 1482.

Fare receiving module 1440 may receive transport fares paid to the vehicle's account. Calculation activation module 1450 may receive a start signal for calculating transport fares, and charge calculation module 1460 may calculate the sum of transport fares during a predetermined time period since receiving the start signal for calculating transport signal.

The payee's terminal may, upon receiving payment, calculate the sum of the transport fares based on the start signal for calculating transport fares. Users can check their charge for correctness according to the sum of the transport fares.

Embodiments of the present invention may be implemented on various universal or dedicated computer system environments or configurations. For example, such computer systems may include personal computers, server computers, handheld or portable devices, tablet-type devices, multiprocessor systems, microprocessor-based systems, set-top boxes, programmable electronic consumption devices, network PCs, minicomputers, mainframe computers, distributed computing environments including any of the above systems or devices, and the like.

Embodiments of the present invention may be described within the general context of computer-executable instructions executed by a computer, such as a program module. Generally, the program module includes a routine, a program, an object, an assembly, a data structure and the like for implementing particular tasks or achieving particular abstract data types. Embodiments of the present invention may also be implemented in distributed computing environments, in which tasks are performed by remote processing devices connected via a communication network. In the distributed computing environments, program modules may be located in local and remote computer storage media that may include a storage device.

The data structures and computer instructions described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The above description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

What is claimed is:

1. A computer-implemented method for wireless payment, comprising:
    mapping, by a server in a database, an account of a payee to a wireless identifier of a wireless network located on a public transport, wherein the payee's account is associated with the public transport;
    receiving, by the server from a mobile device of a user, a request for account information of the payee, wherein the mobile device obtains the wireless network identifier by connecting to the wireless network located on the public transport, wherein the request includes the wireless network identifier, and wherein the user is one of a plurality of passengers on the public transport;
    performing, by the server, a lookup in the database for the account information of the payee based on the wireless network identifier included in the request;
    sending, by the server, the account information of the payee to the mobile device;
    receiving, by the server, data from a plurality of sensors located on or near an entrance of the public transport;
    analyzing the data received from the sensors to determine a number of passengers currently on board the public transport, wherein the number of passengers includes the user;
    receiving a start signal for calculating transport fares to be paid by the number of passengers;
    calculating a first sum of total transport fares due during a predetermined time period since receiving the start signal;
    receiving, from the mobile device via the wireless network, a payment order to make a fare payment to the payee's account;
    receiving a second sum of total transport fares paid, wherein the second sum includes a transport fare paid to the payee's account based on the payment order received from the mobile device, and wherein the second sum further includes transport fares paid to the payee's account based on payment orders received from mobile devices associated with the passengers; and
    in response to determining that the first sum is not equal to the second sum:
        determining that the calculated first sum is incorrect based on the number of passengers;
        sending a payment reminder to the passengers; and
        re-calculating the first sum of the total transport fares due;
    thereby allowing a user or passenger to pay a fare for the public transport using his respective mobile device.

2. The method of claim 1, further comprising:
    in response to determining that the first sum is equal to the second sum:
        determining that the calculated first sum is correct; and
        terminating review of transport fares.

3. The method of claim 1, further comprising:
    receiving one or more images of the passengers from a camera installed on the public transport; and
    applying an optical flow field technique to the one or more images to determine the number of passengers on the public transport.

4. The method of claim 1, further comprising:
    determining a number of passengers who have paid fare for the public transport;
    determining if the number of passengers who have paid the transport fare is equal to the number of passengers currently on board the public transport; and
    responsive to determining that the number of passengers who have paid the transport fare is not equal to the number of passengers currently on board the public transport, sending a reminder to the passengers to make payment.

5. The method of claim 1, wherein the plurality of sensors includes one or more of:
    a sensor installed near the entrance of the public transport;
    two or more infrared sensors located near the entrance of the public transport; or
    a pressure sensor.

6. The method of claim 1, further comprising:
    verifying the number of passengers on board the public transport using an image recognition technology based on images captured by cameras on or near the entrance of the public transport.

7. A computing system comprising:
    one or more processors;
    a memory; and
    a computer-readable medium coupled to the one or more processors storing instructions stored that, when executed by the one or more processors, cause the computing system to perform a method for wireless payment, the method comprising:
    mapping, by a server in a database, an account of a payee to a wireless identifier of a wireless network located on a public transport, wherein the payee's account is associated with the public transport;
    receiving, by the server from a mobile device of a user, a request for account information of the payee, wherein the mobile device obtains the wireless network identifier by connecting to the wireless network located on the public transport, wherein the request includes the wireless network identifier, and wherein the user is one of a plurality of passengers on the public transport;
    performing, by the server, a lookup in the database for the account information of the payee based on the wireless network identifier included in the request;
    sending, by the server, the account information of the payee to the mobile device;
    receiving, by the server, data from a plurality of sensors located on or near an entrance of the public transport;
    analyzing the data received from the sensors to determine a number of passengers currently on board the public transport, wherein the number of passengers includes the user;
    receiving a start signal for calculating transport fares to be paid by the number of passengers;
    calculating a first sum of total transport fares due during a predetermined time period since receiving the start signal;
    receiving, from the mobile device via the wireless network, a payment order to make a fare payment to the payee's account;
    receiving a second sum of total transport fares paid, wherein the second sum includes a transport fare paid to the payee's account based on the payment order received from the mobile device, and wherein the second sum further includes transport fares paid to the payee's account based on payment orders received from mobile devices associated with the passengers; and
    in response to determining that the first sum is not equal to the second sum:
        determining that the calculated first sum is incorrect based on the number of passengers;
        sending a payment reminder to the passengers; and re-calculating the first sum of the total transport fares due;

thereby allowing a user or passenger to pay a fare for the public transport using his respective mobile device.

8. The system of claim 7, wherein the method further comprises:
in response to determining that the first sum is equal to the second sum:
determining that the calculated fist sum is correct; and
terminating review of transport fares.

9. The system of claim 7, wherein the method further comprises:
receiving one or more images of the passengers from a camera installed on the public transport; and
applying an optical flow field technique to the one or more images to determine the number of passengers on the public transport.

10. The system of claim 7, wherein the method further comprises:
determining a number of passengers who have paid fare for the public transport;
determining if the number of passengers who have paid the transport fare is equal to the number of passengers currently on board the public transport; and
responsive to determining that the number of passengers who have paid the transport fare is not equal to the number of passengers currently on board the public transport, sending a reminder to the passengers to make payment.

11. The system of claim 7, wherein the plurality of sensors includes one or more of:
a sensor installed near the entrance of the public transport;
two or more infrared sensors located near the entrance of the public transport; or
a pressure sensor.

12. The system of claim 7, wherein the method further comprises:
verifying the number of passengers on board the public transport using an image recognition technology based on images captured by cameras on or near the entrance of the public transport.

13. A non-transitory computer-readable storage medium storing instructions that when executed by a computer cause the computer to perform a method for wireless payment, the method comprising:
mapping, by a server in a database, an account of a payee to a wireless identifier of a wireless network located on a public transport, wherein the payee's account is associated with the public transport;
receiving, by the server from a mobile device of a user, a request for account information of the payee, wherein the mobile device obtains the wireless network identifier by connecting to the wireless network located on the public transport, wherein the request includes the wireless network identifier, and wherein the user is one of a plurality of passengers on the public transport;
performing, by the server, a lookup in the database for the account information of the payee based on the wireless network identifier included in the request;
sending, by the server, the account information of the payee to the mobile device;
receiving, by the server, data from a plurality of sensors located on or near an entrance of the public transport;
analyzing the data received from the sensors to determine a number of passengers currently on board the public transport, wherein the number of passengers includes the user;
receiving a start signal for calculating transport fares to be paid by the number of passengers;
calculating a first sum of total transport fares due during a predetermined time period since receiving the start signal;
receiving, from the mobile device via the wireless network, a payment order to make a fare payment to the payee's account;
receiving a second sum of total transport fares paid, wherein the second sum includes a transport fare paid to the payee's account based on the payment order received from the mobile device, and wherein the second sum further includes transport fares paid to the payee's account based on payment orders received from mobile devices associated with the passengers; and
in response to determining that the first sum is not equal to the second sum:
determining that the calculated first sum is incorrect based on the number of passengers;
sending a payment reminder to the passengers; and
re-calculating the first sum of the total transport fares due;
thereby allowing a user or passenger to pay a fare for the public transport using his respective mobile device.

14. The non-transitory computer-readable storage medium of claim 13, wherein the method further comprises:
in response to determining that the first sum is equal to the second sum:
determining that the calculated first sum is correct; and
terminating review of transport fares.

15. The non-transitory computer-readable storage medium of claim 13, wherein the method further comprises:
receiving one or more images of the passengers from a camera installed on the public transport; and
applying an optical flow field technique to the one or more images to determine the number of passengers on the public transport.

16. The non-transitory computer-readable storage medium of claim 13, wherein the method further comprises:
determining a number of passengers who have paid the transport fare for the public transport;
determining if the number of passengers who have paid the transport fare is equal to the number of passengers currently on board the public transport; and
responsive to determining that the number of passengers who have paid the transport fare is not equal to the number of passengers currently on board the public transport, sending a reminder to the passengers to make payment.

17. The non-transitory computer-readable storage medium of claim 13, wherein the plurality of sensors includes one or more of:
a sensor installed near the entrance of the public transport;
two or more infrared sensors located near the entrance of the public transport; or
a pressure sensor.

18. The non-transitory computer-readable storage medium of claim 13, wherein the method further comprises:
verifying the number of passengers on board the public transport using an image recognition technology based on images captured by cameras on or near the entrance of the public transport.

19. At least two non-transitory computer-readable media coupled to one or more processors storing instructions that, when executed by the one or more processors, cause a computing system to perform a method for paying transport fare, the method comprising:

detecting, by a mobile device of a user, a wireless network located on a public transport;

establishing, by the mobile device, a connection with the wireless network;

acquiring, by the mobile device, a wireless network identifier from the wireless network;

sending, by the mobile device, the wireless network identifier to a server over the wireless network, wherein the wireless network identifier is previously mapped by the server to an account of a payee, wherein the user is the payee; and in response to a request by the mobile device for account information of the payee:

sending, by the server, the account information of the payee to the mobile device;

receiving, by the mobile device from the server, the account information of the payee, including information regarding a payment account associated with the public transport, wherein the payment account is further associated with the wireless network identifier;

receiving, by the server, data from a plurality of sensors located on or near an entrance of the public transport;

analyzing, by the server, the data received from the sensors to determine a number of passengers currently on board the public transport, wherein the number of passengers includes the user;

receiving, by the server, a start signal for calculating transport fares to be paid by the number of passengers;

calculating, by the server, a first sum of total transport fares due during a predetermined time period since receiving the start signal;

receiving, by the server from the mobile device via the wireless network, a payment order to make a fare payment to the payee's account;

receiving, by the server, a second sum of total transport fares paid, wherein the second sum includes a transport fare paid to the payee's account based on the payment order received from the mobile device, and wherein the second sum further includes transport fares paid to the payee's account based on payment orders received from mobile devices associated with the passengers; and in response to determining, by the server, that the first sum is not equal to the second sum:

determining that the calculated first sum is incorrect based on the number of passengers;

sending a payment reminder to the passengers; and re-calculating the first sum of the total transport fares due;

thereby allowing a user to pay a fare for the public transport via the wireless network.

\* \* \* \* \*